Figure 1:
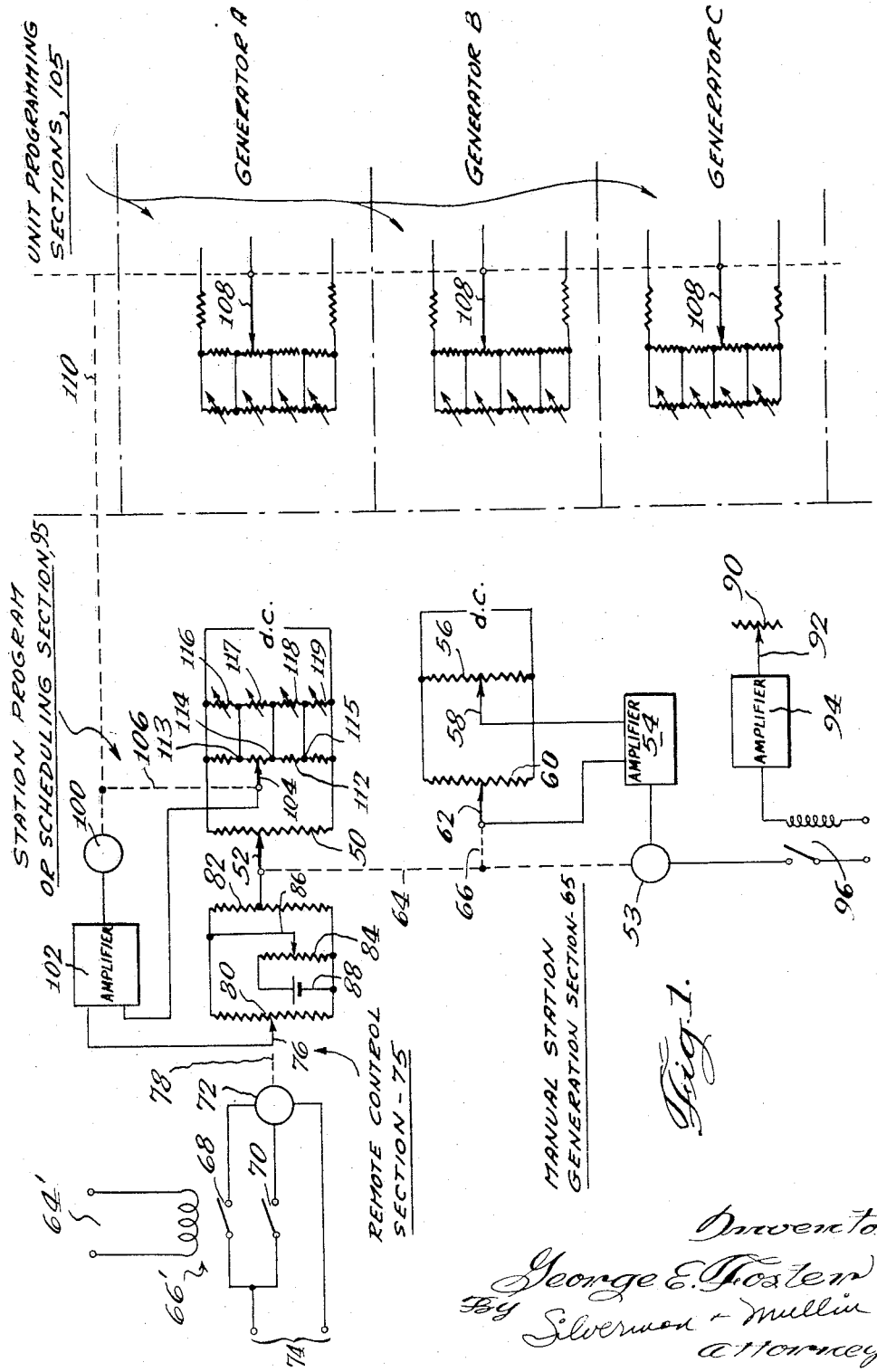

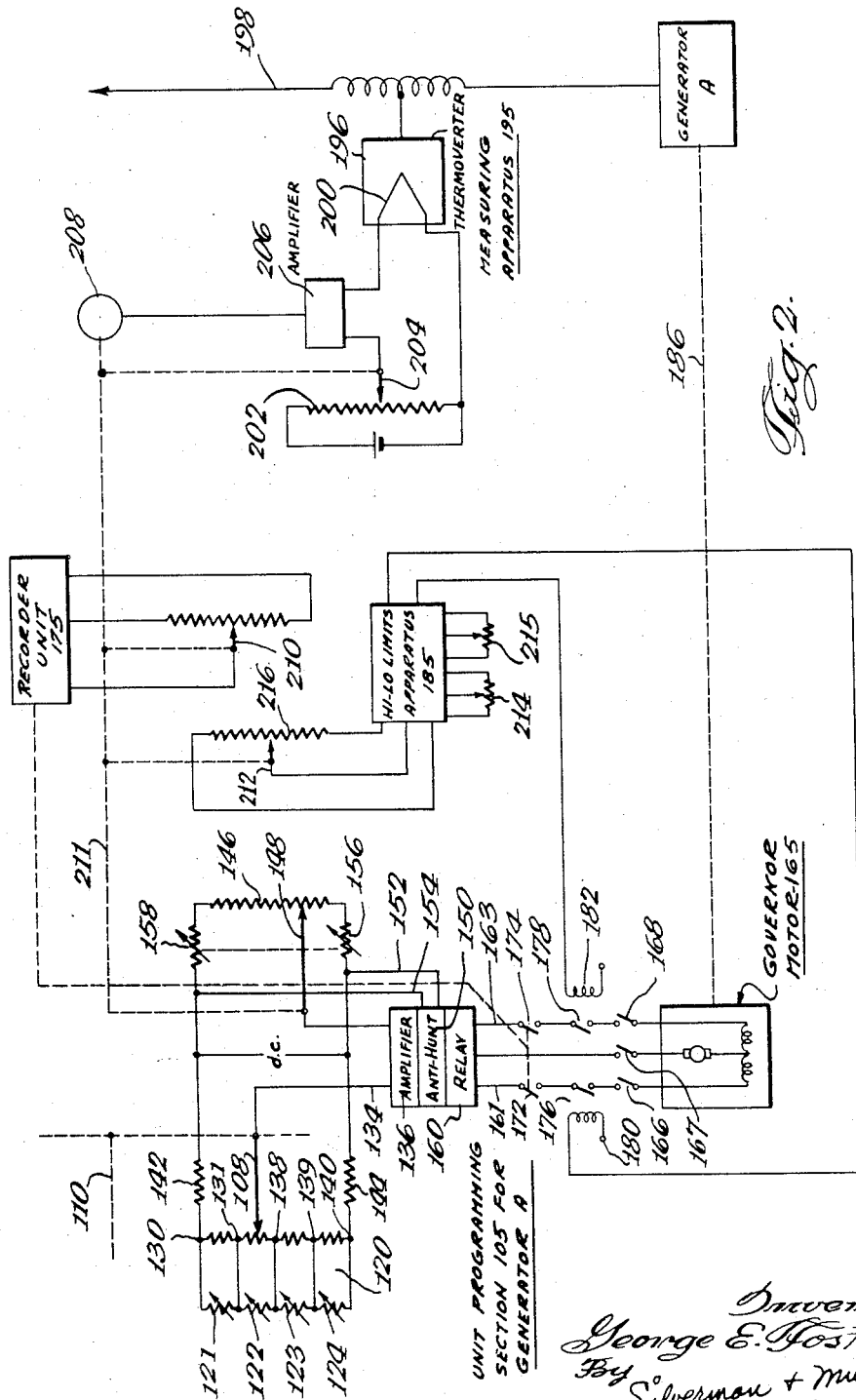

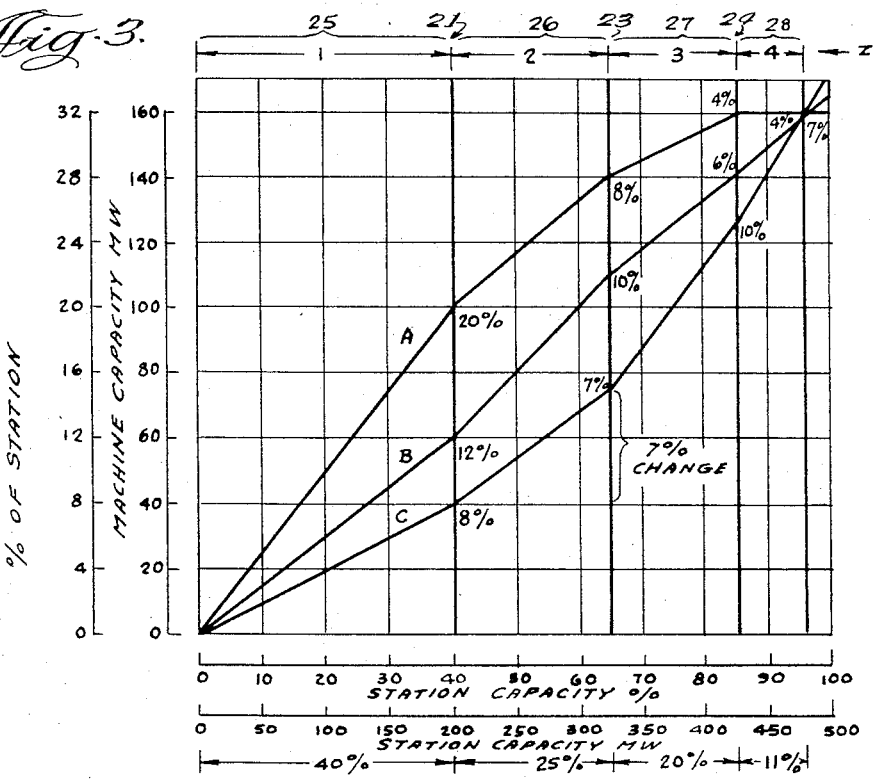
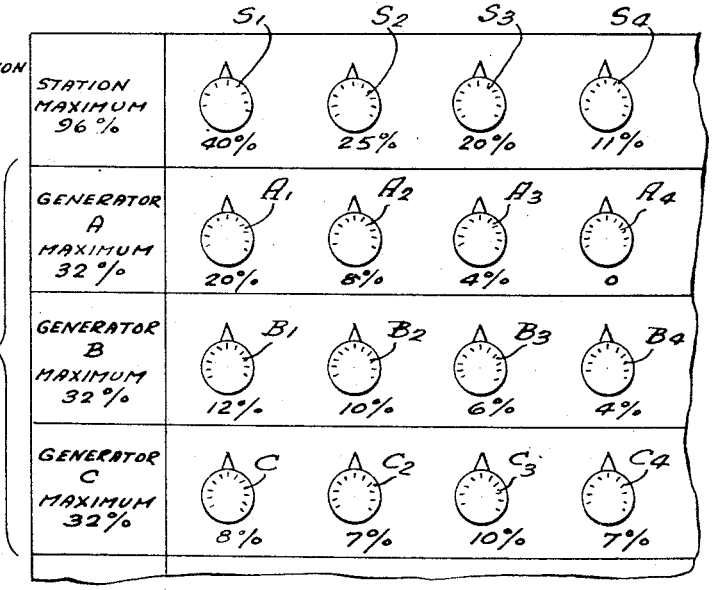

United States Patent Office 2,878,397
Patented Mar. 17, 1959

2,878,397

MULTIPLE PROGRAM CONTROL APPARATUS

George E. Foster, Chicago, Ill., assignor, by mesne assignments, to Bailey Meter Company, a corporation of Delaware Application November 8, 1955, Serial No. 545,657

15 Claims. (Cl. 290—4)

This invention relates generally to electrical apparatus for coordinating the performance of a plurality of individual equipments in such a manner that for any given overall condition, each of the equipments will contribute its functional share in accordance with preset programming for that particular overall condition.

Specifically the invention relates to apparatus enabling each of the individual equipments to be adjusted and preset to perform in a given manner in certain zones of demand called for by the overall condition, whereby during the operation of the overall system, as the composite conditions occur, the individual equipments will each follow their respective program to contribute automatically to the overall picture or condition, regardless of the condition.

As an example, one may consider a power station composed of a number of generating machines, each of which has different output characteristics, caused perhaps by the age of the machine, its size, capacity, constructional peculiarities, etc. In supplying the power demands of the line the station is required to have each of the machines produce and place on the line a certain proportion of the total power, computed at different demand conditions for the maximum economy. A graph or chart is composed and for the different demands, the attendant has heretofore been required to adjust the outputs of the respective generating machines manually in order that the graph or chart be followed. This has required skill, time, and is subject to human error in interpretation and execution. Rapidly changing demands even if occurring rarely, require considerable work and adjustment on the part of the attendants.

With this invention, the projected program of each generating machine may be preset at will to follow any desired non-linear function corresponding to a predetermined chart of desired performance for that particular machine. The total power output of the generating station therefore can be ascertained for any conditions of demand and each machine made to contribute only a desired amount of power in accordance with its preset program. The call for more or less power is represented by a position of a slider on a master potentiometer, for example, and this position of slider is matched in apparatus associated with the respective machines insofar as physical position is concerned, but in view of the preset programming, the positions of the sliders of the machines do not represent power outputs necessarily related linearly to the positions of the sliders. As a matter of fact it is unusual for the relationship to be linear.

As the demand or total desired output varies, varying the position of the slider of the master potentiometer, the sliders of the respective machines will also move to positions automatically providing the programmed respective power outputs. This is done by servo amplifier systems, and hence, except for once setting the program for the station, and the programs for the various machines, the attendant is not required to make any adjustments due to change of demand. The advantages of this type of system are readily apparent, and the principal object of the invention is to provide the basic structure of such a system for accomplishing these advantages and overcoming the objections to the prior art systems.

Although the example illustrated and explained relates to an electrical generating power station, the invention is not limited thereto, as will be evident from the claims. Likewise, the objects of the invention are not limited to provision of this apparatus for power stations.

Other examples of systems which are capable of using the multiple program control apparatus of the invention will occur to those skilled in the art. Principally such systems have more than one varying contributing equipment, and have the characteristic that the contributions of the respective equipments do not change uniformly as between equipments or linearly relative to the system, as the system is operated over varying ranges of demand and so forth. Another example is a steam plant in which there are a great many variables which enter into the overall picture. Some of these are: rate of feed of water, rate of feed of fuel, volume of forced draft, and so forth. Each of a large number of processes enter into the performance of the system, in a different manner for different conditions of output. Each of the equipments providing the function, such as pumps, fans, motors, and the like can be programmed in accordance with a predetermined overall system chart or graph or characteristic which has been produced by experiment or calculation, and operated automatically when the system conditions change.

Refinery plants, chemical process systems, and other apparatus are additional examples which may be served by the invention herein.

Certain objects of the invention are concerned with the provision of various controls, safeguards, for the efficient utilization of the invention, applicable in systems for operating electrical power generating stations as well as other systems.

The versatility and applicability of the invention renders it unnecessary to set forth more objects of the invention than those alluded to above, since those skilled in the art will perceive and become aware of a larger number of advantages and objects than could conveniently be listed, as the description proceeds. The preferred embodiment set forth, as stated previously, relates to electrical power generating systems, but is not intended to be limited thereto. The illustrations are principally schematic with an effort being made to eliminate as much as possible the interlineation and networks caused by showing connections to components and devices well known in the trade, and a further effort being made to use conventional symbols for the parts and elements. For example, mechanical structure for the driving of various devices is not necessarily shown (the means for opening a throttle and admitting steam to a steam engine or opening a valve to admit water to a hydraulic turbine being examples), some power sources are not shown (the power source for the recorder being an example), and the specific diagrams and structure of well-known or commercially available apparatus have not been shown (the servo amplifiers, motors, thyratron operated switching gear, etc. being examples).

In the views illustrated, Fig. 1 is a schematic diagram of the overall system, only a part of the individual machine control circuits being shown, Fig. 2 is a schematic diagram of the apparatus concerned with controlling one machine, Fig. 3 is a graph or chart of a typical program or load schedule diagram and Fig. 4 is a diagram of a load control console top.

Before commencing with the description of the invention as applied to the power station installation, it would be best to call attention to Fig. 3 in which a typical load schedule diagram or graph or chart is illustrated representing the output characteristics of an electric power generating system. It is presumed that this station has three machines, hence, the programming curves are therefore three in number, designated A, B and C. As will be seen from the description following, the economical efficiency of the machines is presumed to be decreasing in the order mentioned, thus that it is desirable to give as much of the load to the A machine as possible.

Note that Fig. 3 is not a chart which is exclusive to the apparatus of the invention. The same chart or a corresponding table of related values is required to be prepared and used in those stations which are manually programmed. Armed with this chart or table the attendant in such stations makes the adjustments to the machines manually.

There are three break-points, 21, 23 and 24 or values of total station output at which programming changes of the individual units must be made, giving rise to the four zones 25, 26, 27 and 28 in any one of which the relative percentage of contribution of the units is substantially constant. Obviously the degree of control of the station is proportional to the number of break-points, which in turn is governed by the practical problems, such as economy of operation and equipment, simplicity, etc.

The particular station is presumed to have a total capacity of 480 megawatts which is shown along the horizontal scale, but considering the total capacity as 500 megawatts and computing percentages on that basis for convenience. While the station is called upon to provide up to 40 percent capacity, the machines will in turn be called upon for twenty fortieths (20/40) of the total station output in the first zone 25, twelve fortieths (12/40), and eight fortieths (8/40) respectively. Thus, at the break-point 21, machine A will provide 100 megawatts, machine B will provide 60 megawatts, and machine C will provide 40 megawatts, making a total of 200 megawatts. The same proportional amounts will be provided in the zone 25, at lower outputs of course.

If the line demands more than 200 megawatts, that is more than 40% of station capacity, the proportions of the demands on the various machines is somewhat changed. Perhaps prior tests have shown that it is more economical that the increase of power output from the machines favor machine B. Thus, the program of machine A calls for it to provide up to 8% of the total increase, B to provide up to 10% of the total increase, and C to provide up to 7%. At break-point 23 this represents an increase in the total station capacity of 25% or an increase of 125 megawatts. At any condition of total output in zone 26 the proportions of output are provided as follows: machine A provides 28/65, B provides 22/65, and C provides 15/65.

In the same maner it can be seen that in zone 27 the proportions change to 32/85, 28/85 and 25/85 taken by the respective machines. In zone 28 the contribution of machine A is constant irrespective of load and hence the function has zero slope, the increased output being all absorbed by machines B and C in the proportions indicated on the chart.

Any time that a break-point is crossed, either increasing or decreasing the total station output, a change must be made in the power output of the three machines to accommodate the characteristics to the functions laid out on the chart. Increase of the number of break-points and increase in the total number of machines increases the difficulty of this being done manually, but the invention herein provides means so that the apparatus adjusts itself automatically, requiring the attendant to do nothing at the break-points but see that the equipment is still properly operating.

With the above discussion in mind it is now desired to describe the means by virtue of which this control is accomplished as applied specifically to an electric power generating station, although it is again desired to mention that the invention is not limited thereto.

The heart of the system comprises a master potentiometer 50 which has a slider 52 the position of which is determined by means of a servo amplifier motor system, of which 53 is the motor and 54 is the amplifier. The potentiometer 56 with slider 58 forms the manual setting device, and 60 represents the error voltage balance potentiometer with its driven slider 62. The motor 53 is connected to the sliders 52 and 62 by the mechanical connections 64 and 66 designated in the usual broken lines (as will be all mechanical ganged connections herein). Obviously the position of the slider 58 comprises a command of sorts to the apparatus to set or change the position of the slider 52 of the master potentiometer 50. This same act, that is, the positioning of the slider 52, could be done manually. For convenience, the manual station generation section of the apparatus is designated 65 in the illustrations.

In the equipment illustrated, a remote station may also contribute to the generation capacity of the station within certain limits. The telephone or other signal line input is shown at 64' connected to a polarized relay 66' having switches 68 and 70 for rotating the motor 72 one way or the other depending upon which switch closes. The number of impulses of course will control the amount of rotation of the motor 72, which is connected to an A. C. line 74.

This section of the apparatus is designated the remote control section 75 since it contributes to the action of the manual station generation section 65 to set the eventual amount of overall station generation of power.

Motor 72 drives a slider 76 through a mechanical connection 78 to cause the slider to traverse a potentiometer 80 which is in parallel with a center tapped potentiometer 82 electrically connected to the slider 52 so that a voltage can be added to or subtracted from that of the potentiometer 50. This will be recognized as a potentiometer adder circuit.

To prescribe the limits of control possible by the remote station, i. e., to set the limits of movement of the slider 52 caused by remote command, there is an adjustable D. C. bias across the potentiometers 80 and 82 applied by means of a rheostat 84, slider 86 and battery 88. This is a safety factor of the apparatus. Another is the rate of change of generation control symbolized by a potentiometer 90, slider 92, amplifier 94 and relay 96 in the line 98 providing the power for the motor 53. For example, amplifier 94 may provide pulses for periodically closing the relay and the rate at which the pulses occur may be controlled by the potentiometer 90 whose position may be manually set on a dial by the operator.

The station program or scheduling section is designated 95 and it will be seen that the same comprises a motor 100 which is operated by servo amplifier 102 which receives balancing signals from the slider 76 and the slider 104. The motor 100 drives the slider 104 through the mechanical connection 106 and simultaneously drives and positions a plurality of sliders 108 of the unit programming sections 105 through a mechanical connection 110.

Directing attention to the station program or scheduling section 95, the slider 104 moves over a potentiometer 112 which is in parallel with the master potentiometer 50 and which has a plurality of shunted taps. It is to be understood that any number of taps may be used, however, only three taps are shown providing four sections which correspond to the three break-points and the four zones previously described. Thus, the potentiometer 112 is divided into four sections by the taps 113, 114 and 115. The sections are shunted by variable rheostats 116, 117, 118 and 119. In practice the resistance of any variable rheostat is substantially less than the resistance of that portion of the potentiometer 112 subtended between taps and parallel with the particular shunting variable rheostat. A practical example uses a ratio of approximately 1 to 10.

By means of the structure described above whereas the movement of the slider 52 along the potentiometer 50 may be linear relative to the set or desired station generation output, the position of the slider 104 will depend upon the adjustments of the various rheostats 116, 117, 118 and 119. It will move up or down in a non-linear fashion and obviously will cause the sliders 108 to move in the same fashion. By suitable adjustment of the rheostats the relationship between the physical position of the sliders of the potentiometer 50 and the potentiometer 112 may be adjusted so that any given voltage characteristic may be achieved.

Each of the unit programming sections 105 is substantially the same and the heart of each section is a potentiometer with taps very similar to the tapped potentiometer of the station program or scheduling section 95.

Looking at Fig. 2 the particular unit programming section 105 which is there illustrated has a tapped potentiometer 120 which is engaged by the slider 108 and adapted to be moved up and down in synchronism with the slider 104. The potentiometer 120 is shunted by the variable rheostats 121, 122, 123 and 124 which may be adjusted so that the voltage output of the potentiometer 120 is a non-linear function of desired characteristics. The output of the potentiometer 120 is used to provide a command voltage which is related to the desired station generation in accordance with both the movement of the slider 108 and the adjustment of the variable rheostats. For any position of the slider 52 there will be an adjusted position of the slider 104. For any adjusted position of the slider 104 there will be a corresponding similar physical position of each of the sliders 108. For any given position of the slider 108 of a particular generator unit, there will be a command voltage operating to place upon the line a percentage of the power output of the station.

The above perhaps may be best visualized by considering a diagrammatic view of a load scheduling console in Fig. 4. Although limited to three break-points and four zones, obviously this is merely illustrative. It will be seen that there are 16 knobs or control members. The top row which consists of the knobs $S_1$, $S_2$, $S_3$ and $S_4$ control the total output of the station. These knobs are adjustments of the rheostats 116 through 119. By placing the knobs in proper positions the zone limits are set, that is, the total percentage of generation desired in each zone is adjusted. Thus, as illustrated, $S_1$ has been set to 40%, $S_2$ has been set to 25% and $S_3$ has been set to 20% and $S_4$ has been set to 11%. These percentages represent the percent of maximum station output and the only function of adjusting the rheostats 116 to 119 is to properly position the slider 104 and hence the sliders 108. Note that the total percentage adds to 96%.

The second row of knobs will control the voltage produced by slider 108 of generator A, and each knob is an adjustment of the respective adjustable rheostats 121 through 124 of Fig. 2. The knob $A_1$ is set at 20%, the knob $A_2$ at 8%, the knob $A_3$ at 4% and the knob $A_4$ at 0%. Comparing this with the curve A of the graph shown in Fig. 3 it will be seen how the characteristics of generator A can be made to follow the desired curve such that at any position of the slider 104 along the potentiometer 112 which represents a demand for power, the particular generator A will respond with its contributory proportion of that power. The arrangement presumes that the power output between break-points will be linear as the voltage variation but so long as at the break-point the desired proportions are achieved non-linearity will make little difference.

Note that according to the physical chaarcteristics and capacity of the generators, each is capable of supplying only one third of the total station capacity, or a total of 32% of total station output. Because of this, the maximum across each row must be 32%. Thus, in the first zone the generator A can deliver up to 20% of total output. Adjustment of rheostat 121 by knob $A_1$ will vary the voltage across the potentiometer 120 from the point 130 to the point 131. As the pointer 108 traverses the potentiometer from 130 to 131 the voltage picked off and inserted as a control voltage by lead 134 into the servo amplifier 136 will vary from zero to some value which, after passing through the various parts of the apparatus will operate a control device for varying the output of the generator A from zero to 20% of the total output of the station. According to the chart shown, this represents a variation of zero to 100 megawatts.

Over this same range, in the first zone 25, generator B has had its corresponding control knob $B_1$ adjusted to 12% and a rheostat similar to 121 has been thereby adjusted so that a control voltage operates the generator control device so that its output ranges from zero to 12% (60 megawatts) between terminals of the rheostat. Knob $C_1$ is set at 8% and the same situation prevails in the unit programming section for its generator C.

The second knob $A_2$ adjusts rheostat 122 and controls the total voltage across the potentiometer 120 from the point 131 to the point 138 and hence affects the voltage picked off by the slider 108 as it traverses this portion of the potentiometer 120. This voltage is equal to the total voltage from point 130 to point 131 (of a value representing an output of 100 megawatts from generator $A_1$) plus the proportional voltage represented by the position of the slider 108 with respect to the total voltage from 131 to 138 (a portion of voltage whose total change can at most add 60 megawatts of output to the generator C).

In similar manner the knob $A_3$ adjusts rheostat 123 and its position as supplying an additional voltage such as to add 4% of total output of station (20 megawatts) to the output of the generator A. The knob $A_4$ adjusts rheostat 124 and its contribution to the voltage controlling the output of generator A occurs in the fourth zone 28. From the chart of Fig. 3 it can be noted that the total capacity of the generator A is already being supplied by the time the fourth zone of demand is reached, and hence generator A cannot be called upon to produce more power beyond the third break-point 24. Thus, knob $A_4$ is set at zero, and the rheostat 124 is also set at zero and short circuits that portion of the potentiometer 120 between points 139 and 140.

It is believed that the explanations of the operation of the programming potentiometers of the other generators B and C is not necessary, since they operate as described in connection with those for controlling generator A. Note from those values marked on the console of Fig. 4 that the total of the settings across must be 32% and the total of vertical settings must equal the maximum percentages in the appropriate zone.

The remainder of the unit programming section 105 has to do with the refinements of control of the generator, and for the explanation thereof attention is again invited to Fig. 2.

The servo amplifier 136 (as true of all servo amplifiers referred to herein) is of conventional and well-known construction commercially available. The value of voltage supplied by the connection 134 is adjusted by resistors 142 and 144 to be over the proper range. Another potentiometer 146 provides the balance voltage for comparison with the command voltage from the slider 108 to achieve the control of the generator output. Slider 148 also operates into the servo amplifier 136. The device 150 is an anti-hunt apparatus which provides control by the leads 152 and 154 to the voltage comparison circuit. The ganged variable resistors 156 and 158 comprise fine adjustment control.

The control of the generator is directed by an amplifier controlled relay 160 which is thyratron operated, and is of conventional construction. An error voltage is produced to drive the governor motor unit 165, either one way or the other. Switches 172 and 174 are safety switches controlled by the recorder unit 175. Switches 176 and 178 are operated by the relays 180 and 182 of the high-low limits apparatus 185. Switches 166, 167 and 168 are for manual control.

The governer motor 165 mechanically controls generator A through a mechanical connection shown at 186. This can consist of the opening and closing of a steam valve of a steam engine driving the generator; it can consist of the throttle control on a diesel engine, metering fuel for the engine which in turn is coupled to the generator; it can consist of a mechanical drive for valves or gates controlling the flow of water through a hydroturbine; and it can consist of many other kinds of prime mover control.

Obviously, other functions can be performed by the governor motor 165 for systems other than electrical generation systems.

There is provided some means for measuring the power output from the generator to supply the comparison voltage for the slider 148, and for other purposes. This may be termed a measuring apparatus 195 which comprises a so-called thermoverter 196 in which the power output represented by the arrow 198 has a small portion thereof converted to heat energy measured by a thermocouple 200 whose output is compared with a voltage across a potentiometer 202 as set by slider 204. The servo amplifier 206 drives a motor 208 which is mechanically coupled to slider 148 by the connection 211. The slider 210 of the recorder unit 175 and the slider 212 of the high-low limits apparatus 185 are also driven by the same connection 211.

Through a system of comparison voltages achieved through adjustment of potentiometers 214 and 215 the high and low points of operation of the equipment may be set as well as the band of operation so that the relays 180 and 182 may operate to prevent the unit from operating beyond set points. The position of the slider 212 on potentiometer 216 provides the necessary information related to total power output.

The voltage provided by the connection 134 may be considered the command voltage. If the unit, i. e., the generator A is not carrying the generation established by the command voltage, the comparison with the voltage of the slider 148 produces an error voltage which drives the amplifier 136. The amplifier generates a voltage which provides a bridge voltage to the anti-hunt circuit 150, while also providing an A. C. voltage to the grids of the thyratrons causing the relay 160 to operate. In the practical example of the invention, the relay device 160 had two sets of two thyratrons each, arranged to produce a voltage in either of the two command leads 161 and 163 to the governor motor 165.

When an error exists, a voltage will be applied across the appropriate circuit of the governor motor to cause it to run in a direction to reduce the error.

The anti-hunt circuit 150 controls the bridge voltage, to reduce the sensitivity of the circuit which operates the motor when the motor is running. This causes the governor motor to stop slightly ahead of the position it would have stopped if full sensitivity had been used at all times. As the governor motor stops, the bridge voltage increases, along with sensitivity, causing the governor motor to nudge into correct position, at which there is no error voltage.

The anti-hunt circuit is equipped with time constants suitable for the appropriate governor motor 165 and generator used, plus a consideration related to the time delays of the measuring apparatus 195. The result is that the amplifier 136, anti-hunt circuit 150, and the relay system 160 will cause the governor to position the output of the generator A without overshoot.

The recorder unit has manually set stop limits for additional safety of the equipment for opening the controls to the motor 165 through switches 172 or 174.

It will be appreciated by those skilled in the art that the exact manner of accomplishing the desired safety functions and the refinements of synchronization, antihunt, recordation, and the like are capable of considerable variation from installation to installation. The requirements of different safety codes, design demands, economic limitations may alter and greatly change the structure, all within the scope of the invention. Principally, the voltage of command is compared with the voltage proportional to the output for controlling the output in accordance with the program set into the apparatus, as a result of which the output follows the pre-set program. This is true of all of the generators A, B and C and any others which may comprise the system controlled by the apparatus of the invention.

It is further believed that the application of the invention to various other systems for the programming thereof in accordance with varying outputs need not be explained, since the modification of the invention to suit these systems is also within the skill of the skilled artisan.

What it is desired to secure by Letters Patent of the United States is:

1. Programming apparatus for automatic operation of a system of units whereby they assume different percentages of a variable total load as it changes in value in accordance with a preset program for each unit, comprising an error-voltage actuated driving device, a comparison circuit including means for producing said error-voltage, comprising a first potentiometer having a linear resistance element therein and a slider movable along the same to apply the voltage at the point of contact to said means, a second potentiometer having a second slider movable along the same and mechanically coupled to said driving device to be moved thereby and said slider connected to apply the voltage at its point of contact also to said means, whereby the placement of the first slider to any position along its resistance element will result in movement of the second slider by the driving device to a position resulting in balance and an absence of error-voltage, the second potentiometer being formed of a plurality of series-connected resistance sections, each section of which is adjustable to be pre-set to variable values of resistance for programming the total load into zones, whereby the position of the second slider and that of the first slider can be non-linearly related, and means mechanically driven in unison with said second slider for controlling the several units simultaneously within the same zones.

2. Apparatus as claimed in claim 1 in which the said sections are each linear so that, while the total traversed movement of the second slider need not be linearly related to the total traversed movement of the first slider, the movement of the second slider over each section will have linear relation.

3. Apparatus as claimed in claim 1 in which the means driven in unison with the second slider comprise contributing devices operating to provide from said units total output demand of said system, and the first slider is moved to a contact point along its resistance element, the value of which is directly related to the total output demand, the said contributing devices being driven non-linearly to provide such demand, and the sections of said second potentiometer being adjusted in accordance with the non-linear operation of said contributing devices.

4. A multiple program control device for a production system in which the output at any demand is a result of the cumulative effect of a plurality of independent contributing apparatuses the respective quantitative contribution of which is not required to be linearly related to the demand or to the relative contribution of all of the others which comprises, each contributing apparatus having error-voltage actuated control means for increasing or decreasing the output of the said apparatus in accordance with the value and polarity of said error voltage; means producing said error voltage, including a comparison circuit having means for comparing a programmed command voltage with a voltage directly related to the instantaneous output of said apparatus; means responsive to the said output of the apparatus to determine said last mentioned voltage, means for producing said programmed command voltage including a programming potentiometer formed of a plurality of series connected sections, the resistance of each section being manually variable, and a slider movable over the potentiometer to vary the command voltage produced thereby, and means driving the sliders of all of the contributing apparatuses in unison to produce a command voltage for each to cause the respective outputs to correspond in quantity with predetermined adjusted characteristics of the respective potentiometers.

5. A multiple program control device as claimed in claim 4 in which the means driving all of the sliders comprises a second error-voltage actuated driving means, a second comparison circuit for producing said error voltage having a master potentiometer and slider to provide one error voltage, the linear position of which slider is adjustable to positions representing values of required total output and said second comparison circuit having a control potentiometer formed of a plurality of series connected sections, the resistance of each section being manually variable and provided with a programming slider movable over the potentiometer by said second driving means to vary a second comparison voltage produced thereby so as to cause the second driving means to move all of said first mentioned sliders in unison to the same position, said position being controlled by the pre-set adjustment of the resistance of the sections of the control potentiometer and the setting of the slider on the master potentiometer.

6. A device as claimed in claim 4 in which the sections of the programming potentiometer are each linear such that when adjusted for any program, the command voltage provided through movement of the slider along the programming potentiometer is linear along each section, and cumulative along the length of the potentiometer.

7. A device as claimed in claim 4 in which each section of the programming potentiometer comprises a portion between any two of a plurality of equally positioned consecutive points having a shunted variable rheostat connected across the points.

8. A device as claimed in claim 5 in which means are provided for adjusting the voltage controlled by the slider of said adjustable master potentiometer from a remote position to call for more or less total output, comprising a remotely driven actuating means, a voltage adder potentiometer circuit having a slider driven by said actuating means and connected to arithmetically add a voltage to the error-voltage provided by said master potentiometer.

9. A device as claimed in claim 5 in which means are provided for adjusting the voltage controlled by the slider of said adjustable master potentiometer from a remote position to call for more or less total output, comprising a remotely driven actuating means, a voltage adder potentiometer circuit having a slider driven by said actuating means and connected to arithmetically add a voltage to the error-voltage provided by said master potentiometer, and means limiting the amount of said added voltage.

10. A producing system responsive to demand occurring over a range of zones of total power output between break-points, said system comprising a plurality of sources each contributing to the total output in accordance with a predetermined program, and each source having independent regulating means responsive to control, said sources each contributing at linear rates in the zones, but the slope of said rate arranged to change at each break-point, said regulating means being electrically actuated and there being an electrical signal producing means for each regulating means including a mechanically movable slider and an impedance device traversed by said slider to produce a signal the characteristic of which is directly related to the output characteristic of the associated source, the impedance device having means to enable the impedance along the electrical length traversed to be varied, means connecting said slider electrically to said electrical signal producing means, means for driving all of said sliders to a position on their respective potentiometers simultaneously to produce the required total output, and means producing a rebalancing voltage opposing that selected by each of said sliders.

11. A system as described in claim 10 in which said slider driving means includes a self-balancing comparison circuit including a linear potentiometer, a potentiometer adjustable to a non-linear impedance characteristic along its length, sliders engaging said potentiometers, said circuit including error-voltage producing means and an error-voltage driven motor connected with the slider of said non-linear potentiometer and all of said ganged sliders, and means for adjusting the position of said slider of said linear potentiometer to a mechanical and voltage-wise position along its length linear with respect to total power demand.

12. A structure as described in claim 10 in which each source has means responsive to the respective source output to produce a voltage related to said output, and means comparing same with the signal of said impedance device of said source, means impressing the voltages compared upon said electrical signal producing means, whereby the operation of the respective sources is automatically maintained at values set by said pre-determined program.

13. A producing system responsive to demand occurring over a range of zones of total power output, said system comprising a plurality of sources each contributing to the total output in accordance with a predetermined program, a prime mover for each source and a governor motor system for the prime mover, a servo amplifier system for providing an error voltage for each governor motor, and a comparison circuit for each servo amplifier system, the comparison circuit having one potentiometer the slider of which is positioned in accordance with the source output, and a second potentiometer formed of series connected variable resistance units and having a driven slider, a control comparison circuit including a second servo amplifier and motor connected to drive all driven sliders simultaneously and including a linear and a non-linear potentiometer, the motor also driving the slider of the non-linear potentiometer, and the slider of the linear potentiometer being adjustable to positions directly related to total required output.

14. The system defined in claim 13 in which the second servo amplifier is supplied with error voltage for operation of the motor by a circuit including said non-linear potentiometer, said linear potentiometer and a second linear potentiometer in a potentiometer-adder circuit, means to adjust the slider of the said linear potentiometer in accordance with local demand and means to adjust said second linear potentiometer in accordance with remote demand.

15. The system as defined in claim 13 in which the potentiometers are formed of a series of connected variable resistance units and the non-linear potentiometers are each divided into similar zones within each of which the resistance varies linearly.

References Cited in the file of this patent

UNITED STATES PATENTS

| | | |
|---|---|---|
| 2,692,342 | Nichols et al. | Oct. 19, 1954 |
| 2,732,506 | Carolus | Jan. 10, 1956 |
| 2,743,097 | Carolus | Apr. 24, 1956 |
| 2,754,429 | Phillips | July 10, 1956 |
| 2,773,994 | Cohn | Dec. 11, 1956 |